United States Patent
Kao et al.

[11] Patent Number: 5,710,464
[45] Date of Patent: Jan. 20, 1998

[54] POWER DRIVE SYSTEM FOR CONVERTING NATURAL POTENTIAL ENERGY INTO A DRIVING POWER TO DRIVE A POWER GENERATOR

[76] Inventors: I. Nan Kao; Yee Kon Kao; Yee Jane Kao; De Ching Lee, all of No. 5, Minchuan St., Hu-Kou Hsiang, Hsinchu, Taiwan

[21] Appl. No.: 587,520

[22] Filed: Jan. 17, 1996

[51] Int. Cl.⁶ ............................................ F03B 13/12
[52] U.S. Cl. .................... 290/53; 60/498; 60/506; 417/332
[58] Field of Search .................... 290/42, 53, 54, 290/43; 60/506, 497, 495, 504, 505; 417/333, 332, 331, 330

[56] References Cited

U.S. PATENT DOCUMENTS

| | | | |
|---|---|---|---|
| 1,264,737 | 4/1918 | Woods | 417/331 |
| 2,436,517 | 2/1948 | Lewis | 417/332 |
| 3,569,725 | 3/1971 | Rosenberg | 290/53 |
| 3,970,415 | 7/1976 | Widecrantz et al. | 417/332 |
| 4,092,828 | 6/1978 | Garza | 60/506 |
| 4,218,192 | 8/1980 | West | 417/333 |
| 4,363,213 | 12/1982 | Paleologos | 60/505 |
| 4,454,429 | 6/1984 | Buonome | 290/53 |

*Primary Examiner*—Clayton E. LaBalle
*Assistant Examiner*—Nicholas Ponomarenko
*Attorney, Agent, or Firm*—Morton J. Rosenberg; David I. Klein; Jun Y. Lee

[57] ABSTRACT

A power drive system which includes a water collecting barrel vertically fastened to the oceanic crust under the sea level and having a reduced top end connected to the power input port of a power generator; a plurality of water tubes radially connected to the water collecting barrel for guiding sea water to the power input port of the power generator to move it into operation; a plurality of rockers respectively pivoted to the water collecting barrel; a plurality of floating devices floating on the sea level; a plurality of connecting rods connected between the floating devices and the rocker; and water pump means driven by the rockers to pump water into the water tubes and the water collecting barrel to force the power generator into operation.

7 Claims, 3 Drawing Sheets

POWER DRIVE SYSTEM FOR CONVERTING NATURAL POTENTIAL ENERGY INTO A DRIVING POWER TO DRIVE A POWER GENERATOR

BACKGROUND OF THE INVENTION

The present invention relates to a power drive system for turning a power generator, and relates more particularly to such a power drive system which converts the potential energy of the rising and falling of the tide into a driving power to drive a power generator.

A variety of power Generating plants, including hydraulic power plants, thermo-power plants, nuclear power plants, etc., have been installed in different places for generating electric power supply. Except hydraulic power plants, conventional power generating plants will produce pollutions during the operation. Although a hydraulic power plant is economic and does not cause any pollution to the environment during its operation, it is difficult to find a place suitable for the installation of a hydraulic power plant.

SUMMARY OF THE INVENTION

The present invention has been accomplished under the circumstances in view. It is one object of the present invention to provide a power drive system for driving a power generator which is safe in use. It is another object of the present invention to provide a power drive system for driving a power generator which is economic in use. It is still another object of the present invention to provide a power drive system for driving a power generator which does not cause any pollution to the environment during its operation. According to one aspect of the present invention, the power drive system comprises a water collecting barrel vertically fastened to the oceanic crust under the sea level and having a reduced top end connected to the power input port of a power generator, a plurality of water tubes radially connected to the water collecting barrel for guiding sea water to the power input port of the power generator to move it into operation, a plurality of rockers respectively pivoted to the water collecting barrel, a plurality of floating devices floating on the sea level, a plurality of connecting rods connected between the floating devices and the rocker, and water pump means driven by the rockers to pump water into the water tubes and the water collecting barrel to force the power generator into operation. According to another aspect of the present invention, the water pump means comprises a plurality of cylinders respectively connected to the water tubes remote from the water collecting barrel, a plurality of piston valves respectively moved in the cylinders, and a plurality of piston valve rods connected between the piston valves and the rockers and driven by the rockers to reciprocate the piston valves in the cylinders, wherein the piston valves permit sea water to pass into the cylinders when moved outwards, or force sea water from the cylinders into the water collecting barrel through the water tubes to turn the power generator when moved inwards.

DETAILED DESCRIPTION OF THE PREFERRED EMBODIMENT

Figure 1:
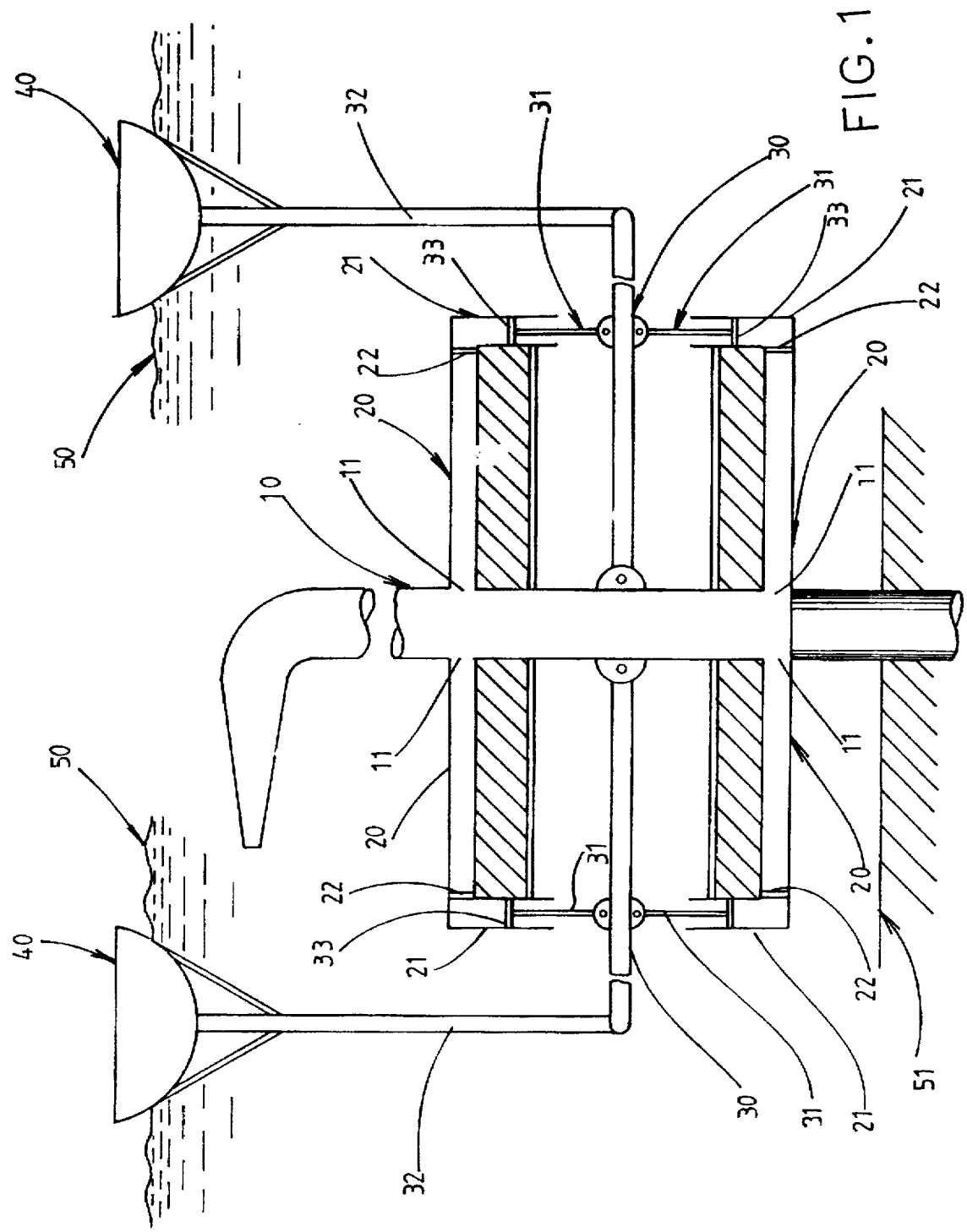
FIG. 1 shows the arrangement of the power drive system according to the preferred embodiment of the present invention.

Referring to FIG. 1, a power drive system in accordance with the present invention is to convert the potential energy of the rising and falling of the tide into a driving power to drive a power generator, comprising a water collecting barrel 10 vertically fastened to the oceanic crust 51 under the sea level 50 and having two sets of radial through holes 11 at different elevations, a plurality of water tubes 20 respectively connected to the radial through holes 11, a plurality of rockers 30 respectively pivoted to the water collecting barrel 10 at an elevation between the two sets of radial through holes 11, a plurality of floating devices for example buoyancy floats 40 floating on the sea level 50, a plurality of connecting rods 32 respectively connected between the floats 40 and the rockers 30, a plurality of cylinders 21 respectively connected to the water tubes 20 remote from the water collecting barrel 10, a plurality of one-way valves 22 respectively connected between the cylinders 21 and the water tubes 20, a plurality of piston valves 33 respectively moved in the cylinders 21, and a plurality of piston valve rods 31 pivotably connected between the piston valves 33 and the rockers 30, wherein each of the connecting rods 32 has a top end fixedly fastened to the bottom side of one float 40, and a bottom end pivoted to one rocker 30 at one end remote from the water collecting barrel 10; each of the piston valve rods 31 has one end fixedly connected to one piston valve 33, and an opposite end pivoted one rocker 30 in the middle. Therefore, the rockers 30 work as the second kind of lever having the fulcrum at the barrel 11, the power at the connecting rods 32, and the weight at the piston valve rods 31. The barrel 10 has a reduced top end connected to the power input port of a power generator. Furthermore, the radial through holes 11 (the water tubes 20) must be disposed below the sea level 50 when the tide falls so that sea water can be driven through the water tubes 20 into the barrel 11 and forced to turn the power generator.

Figure 2:
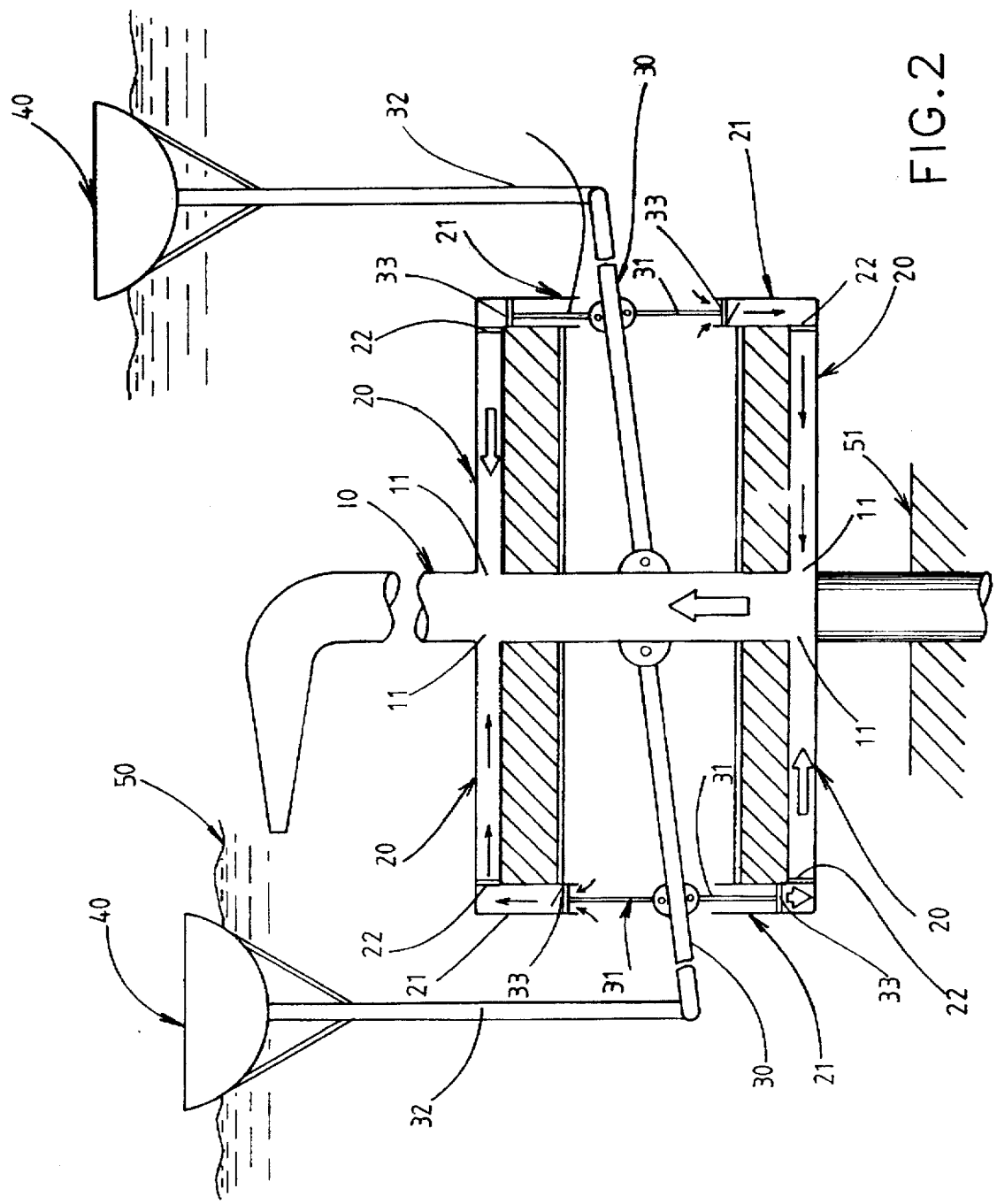
FIG. 2 shows the power drive system of FIG. 1 operated.

Referring to FIG. 2, when floats 40 float up and down with the rising and falling of the sea level, the rockers 30 are alternatively moved up and down, causing the piston valve rods 31 to reciprocate the piston valves 33 in the cylinders 21. When the piston valves 33 are respectively moved outwards, sea water is allowed to flow into the respective cylinders 21. When the piston valves 33 are respectively moved inwards, sea water is driven from the respective cylinders 21 through the respective one-way valves 22 and the respective water tubes 20 into the barrel 10 to further drive the power generator.

Figure 3:
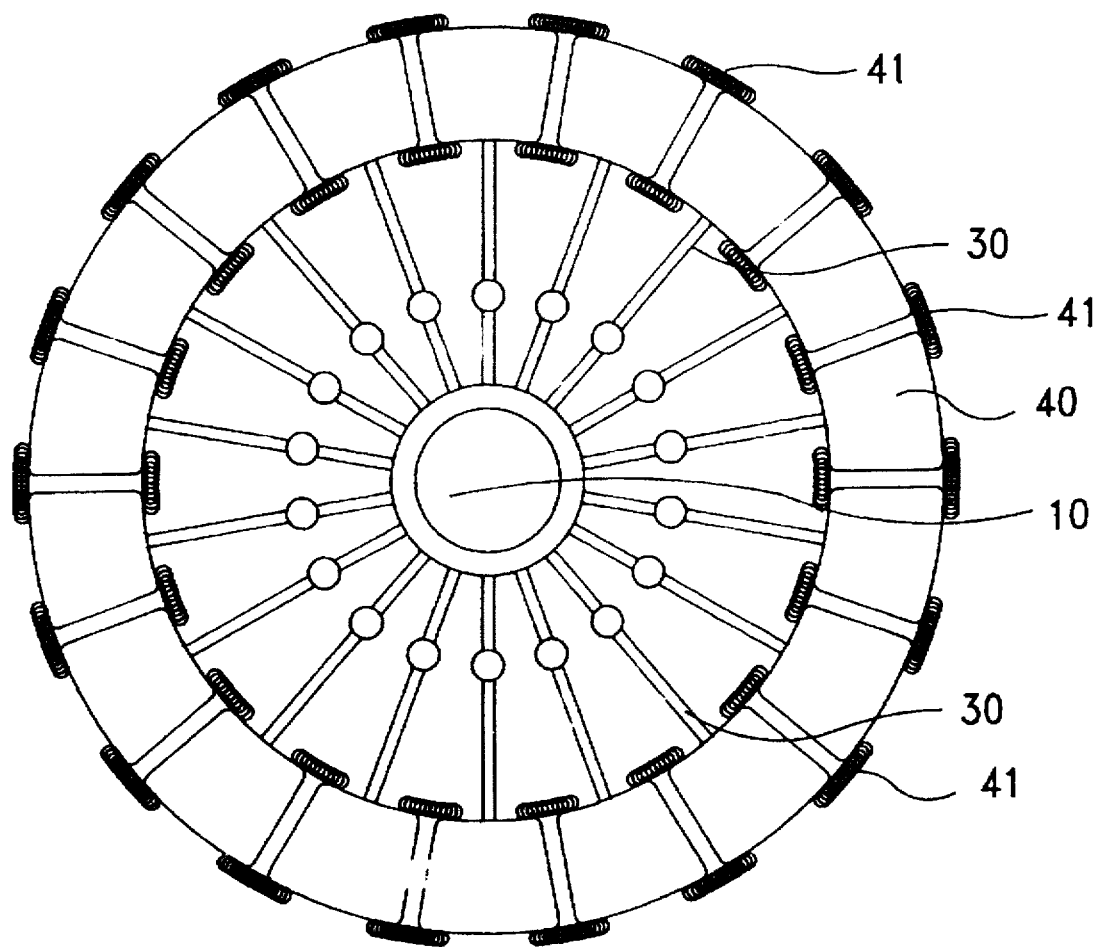
FIG. 3 shows an alternate form of the power drive system according to the present invention.

FIG. 3 shows an alternate form of the present invention. According to this alternate form, the buoyancy floats 40 are arranged around the barrel 10 and connected together by chains 41. Therefore, the buoyancy floats 40 are simultaneously moved together with the rising and falling of the sea level to force the rockers 30 up and down. Furthermore, each of the buoyancy floats 40 has an expanded top side and a reduced bottom side, and the center of gravity of each of the buoyancy floats 40 is disposed at the reduced bottom side.

It is to be understood that the drawings are designed for purposes of illustration only, and are not intended as a definition of the limits and scope of the invention disclosed.

We claim:

1. A power drive system for converting the potential energy of the rising and falling of the tide into a driving power to drive a power generator, comprising:

a water collecting barrel vertically fastened to the oceanic crust under the sea level, having two sets of radial through holes circumferentially disposed under said sea level at two elevations on the barrel, and a reduced top end connected to a power input port of a power generator;

a plurality of water tubes having first and second ends thereof, said first ends being respectively connected to said radial through holes for guiding sea water into said water collecting barrel to move said power input port of said power generator;

a plurality of rockers, each rocker having a fixed end pivoted to said water collecting barrel between said two elevations and a free end, reciprocating between said second ends of the water tubes at said two elevations;

a plurality of floating devices floating on the sea level;

a plurality of connecting rods, disposed beneath the sea level, each having one end fixedly secured to one floating device and an opposite end pivoted to said free end of one rocker; and water pump means at said second ends of the water tubes distant from respective said radial through holes on the barrel and driven by said rockers to pump water into said water tubes and said water collecting barrel to force said power generator into operation.

2. The power drive system of claim 1 wherein said radial through holes are symmetrically disposed at different elevations under the sea level for mounting said water tubes.

3. The power drive system of claim 1 wherein said water pump means comprises a plurality of cylinders respectively connected to said water tubes remote from said water collecting barrel; a plurality of piston valves respectively moved in said cylinders, said piston valves permitting sea water to pass into said cylinders when moved outwards, or forcing sea water from said cylinders into said water collecting barrel through said water tubes to turn said power generator when moved inwards; and a plurality of piston valve rods, each piston valve rod having one end fixedly connected to one piston valve and an opposite end pivoted to one rocker between its free end and fixed end.

4. The power drive system of claim 3 further comprising a plurality of one-way valves respectively mounted between said water tubes and said cylinders to prohibit reverse flow of sea water.

5. The power drive system of claim 1 wherein said floating devices are buoyancy floats.

6. The power drive system of claim 5 wherein each buoyancy float has an expanded top side and a reduced bottom side, and a center of gravity of each buoyancy float is disposed at the reduced bottom side.

7. The power drive system of claim 5 wherein said buoyancy floats are arranged around said water collecting barrel and connected together by chains.

* * * * *